US010680233B2

(12) United States Patent
Solan et al.

(10) Patent No.: US 10,680,233 B2
(45) Date of Patent: Jun. 9, 2020

(54) METHOD FOR MANUFACTURING AN ELECTRODE FOR AN ACCUMULATOR (71) Applicant: COMMISSARIAT A L'ENERGIE ATOMIQUE ET AUX ENERGIES ALTERNATIVES, Paris (FR)

(72) Inventors: Sebastien Solan, Seyssinet-Pariset (FR); Camille Guerin, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 220 days.

(21) Appl. No.: 15/812,214

(22) Filed: Nov. 14, 2017

(65) Prior Publication Data
US 2018/0138495 A1 May 17, 2018

(30) Foreign Application Priority Data
Nov. 15, 2016 (FR) ..................... 16 61025

(51) Int. Cl.
*H01M 4/04* (2006.01)
*H01M 4/1391* (2010.01)
(Continued)

(52) U.S. Cl.
CPC ....... *H01M 4/0483* (2013.01); *B29C 48/0021* (2019.02); *B29C 48/022* (2019.02);
(Continued)

(58) Field of Classification Search
CPC ...... H01M 10/056; H01M 4/131; H01M 4/50; H01M 4/525; H01M 4/0411;
(Continued)

(56) References Cited

U.S. PATENT DOCUMENTS

| 5,749,927 A | 5/1998 | Chern et al. |
| 6,939,383 B2 | 9/2005 | Eastin et al. |

(Continued)

FOREIGN PATENT DOCUMENTS

| CA | 2 435 218 A1 | 1/2005 |
| EP | 2 618 409 A1 | 7/2013 |

(Continued)

OTHER PUBLICATIONS

U.S. Appl. No. 15/001,393, filed Jan. 20, 2016, 2016/0141562 A1, Nelly Giroud, et al.
(Continued)

*Primary Examiner* — Carl J Arbes
(74) *Attorney, Agent, or Firm* — Oblon, McClelland, Maier & Neustadt, L.L.P.

(57) ABSTRACT

The invention relates to a method of manufacturing a separating membrane in gel form, for an alkali metal ion battery, the method consisting of extruding a mix comprising:
  an alkali metal salt,
  a dinitrile compound with formula N≡C—R—C≡N, in which R is a hydrocarbon group $C_nH_{2n}$, and n is equal to 1 or 2 and preferably equal to 2,
  a hot melt support polymer, soluble in the dinitrile compound.

18 Claims, 3 Drawing Sheets

(51) Int. Cl.

| | |
|---|---|
| *H01M 4/505* | (2010.01) |
| *H01M 4/525* | (2010.01) |
| *H01M 4/62* | (2006.01) |
| *H01M 4/58* | (2010.01) |
| *H01M 4/1397* | (2010.01) |
| *H01M 10/0525* | (2010.01) |
| *B29C 48/08* | (2019.01) |
| *B29C 48/00* | (2019.01) |
| *B29C 48/36* | (2019.01) |
| *B29C 48/80* | (2019.01) |
| *H01M 4/13* | (2010.01) |
| *H01M 4/02* | (2006.01) |
| *B29K 509/00* | (2006.01) |
| *B29K 507/04* | (2006.01) |
| *B29K 33/00* | (2006.01) |
| *B29L 31/34* | (2006.01) |

(52) U.S. Cl.
CPC .............. *B29C 48/08* (2019.02); *B29C 48/36* (2019.02); *B29C 48/802* (2019.02); *H01M 4/0411* (2013.01); *H01M 4/13* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 4/622* (2013.01); *H01M 4/625* (2013.01); *H01M 10/0525* (2013.01); *B29K 2033/12* (2013.01); *B29K 2507/04* (2013.01); *B29K 2509/00* (2013.01); *B29K 2995/0005* (2013.01); *B29K 2995/0082* (2013.01); *B29L 2031/3468* (2013.01); *H01M 4/621* (2013.01); *H01M 4/624* (2013.01); *H01M 2004/023* (2013.01); *H01M 2004/027* (2013.01); *H01M 2004/028* (2013.01)

(58) Field of Classification Search
CPC .............. H01M 4/0483; H01M 4/1391; H01M 4/1397; H01M 4/505; H01M 4/5825; H01M 4/625; H01M 4/621; H01M 4/622; H01M 4/624; H01M 10/0525; H01M 2004/023; H01M 2004/027; H01M 2004/028; B29C 48/0021; B29C 48/022; B29C 48/08; B29C 48/36; B29C 48/802; B29K 2033/12; B29K 2507/04; B29K 2509/00; B29K 2995/0005; B29K 2995/0082; B29L 2031/3468
See application file for complete search history.

(56) References Cited

U.S. PATENT DOCUMENTS

| | | | | |
|---|---|---|---|---|
| 8,415,058 | B2* | 4/2013 | Sakata | H01M 4/13 429/223 |
| 8,673,505 | B2* | 3/2014 | Ohzuku | H01M 4/485 429/224 |
| 8,691,446 | B2* | 4/2014 | Sakata | H01M 4/13 429/223 |
| 8,795,884 | B2* | 8/2014 | Sakata | H01M 4/131 429/199 |

FOREIGN PATENT DOCUMENTS

| | | |
|---|---|---|
| FR | 2 841 045 | 12/2003 |
| FR | 2 985 857 A1 | 7/2013 |
| FR | 3 040 550 A1 | 3/2017 |
| JP | 07176322 A * | 7/1995 |
| WO | WO 97/44847 A1 | 11/1997 |
| WO | WO 2007/012174 A1 | 2/2007 |
| WO | WO 2008/138110 A1 | 11/2008 |

OTHER PUBLICATIONS

French Preliminary Search Report dated Jul. 17, 2017 in French Application 16 61025, filed on Nov. 15, 2016 (with English Translation of Categories of cited documents).

Myung-Hyun Ryou, et al. "Cross-linkable Polymer Matrix for Enhanced Thermal Stability of Succinonitrile-based Polymer Electrolyte in Lithium Rechargeable Batteries", Journal of Electrochemical Science and Technology, vol. 2, No. 4, 2011, 6 pages.

Li-Zhen Fan, et al. "Succinonitrile as a Versatile Additive for Polymer Electrolytes", Advanced Functional Materials, 17, 2007, 8 pages.

Li-Zhen Fan, et al. "All-solid-state polymer electrolyte with plastic crystal materials for rechargeable lithium-ion battery", Journal of Power Sources, 189, 2009, 4 pages.

Nadine Voigt, et al. "The effect of plastic-crystalline succinonitrile on the electrolyte system PEO: $LiBF_4$: Insights from solid state NMR", Solid State Ionics, 260, 2014, 11 pages.

Li-Zhen Fan, et al. "Composite effects in poly(ethylene oxide)-succinonitrile based all-solid electrolytes", Electrochemistry Communications, 8, 2006, 4 pages.

Yan-Hua Li, et al. "A novel polymer electrolyte with improved high-temperature-tolerance up to 170° C. for high-temperature lithium-ion batteries", Journal of Power Sources, 244, 2013, 6 pages.

Katharina M. Freitag, et al. "Enhancement of Li Ion Conductivity by Electrospun Polymer Fibers and Direct Fabrication of Solvent-Free Separator Membranes for Li Ion Batteries", Inorganic Chemistry, 56, 2017, 8 pages.

* cited by examiner

METHOD FOR MANUFACTURING AN ELECTRODE FOR AN ACCUMULATOR

TECHNICAL DOMAIN

This invention relates to a method of manufacturing an electrode for an accumulator. More particularly, this invention relates to a method of making a flexible or even deformable electrode in gel form for an accumulator.

PRIOR ART

Figure 1:
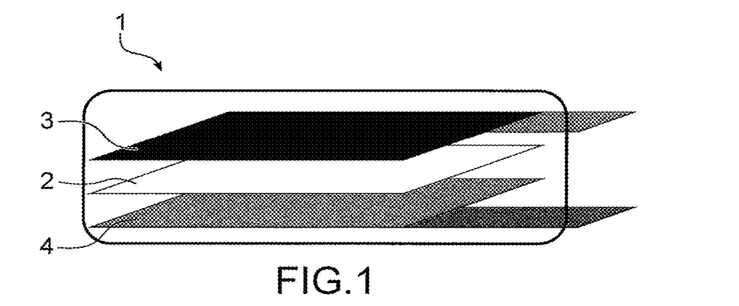

A lithium ion battery, illustrated in FIG. 1 and known in the state of the art, generally comprises:
- one or several electrochemical cores 1, each electrochemical core comprising an electrolytic constituent 2 inserted between a negative electrode 3 and a positive electrode 4, said positive electrode comprising an insertion material, for example the lithium cation,
- two current collectors 5 and 6, of the positive electrode and the negative electrode respectively,
- a solid or flexible packaging inside which the electrochemical core is located and that is hermetically sealed so as to make the device leak tight.

Current return tabs connected to the two collectors exit from packaging.

The positive electrode generally comprises a lithium cation insertion material. For example, this insertion material may comprise composite materials, for example of the $LiFePO_4$ type (lithium ion phosphate), or a transition metal oxide (lamellar materials: $LiCoO_2$:lithium cobalt oxide, $LiNi_{0.33}Mn_{0.33}CO_{0.33}O_2$ etc. . . . ).

The electrolytic constituent comprises a separator, physically separating the positive and negative electrodes. The separator may include a polymer material or a microporous composite, and is usually soaked with an organic electrolytic solution capable of transporting lithium ions from one electrode to the other. More specifically, lithium ions are transported from the positive electrode to the negative electrode during a charge cycle, and in the opposite direction during a discharge cycle.

The organic electrolytic solution, usually free of traces of water and/or oxygen, may include a mix of organic solvents (for example carbonates) to which a lithium salt is added, for example $LiPF_6$.

The negative electrode may be made of graphite carbon, silicon, or when power applications are envisaged, $Li_4Ti_5O_{12}$ (titanate material).

The current collector of the positive electrode is usually made of aluminium. Furthermore, the positive electrode may be formed by a technique for deposition of the insertion material on the current collector. The deposition technique may be an induction, silk screen printing or ink jet technique, or even spraying of a liquid.

The current collector of the negative electrode may be made of copper or aluminium depending on whether the negative electrode is made of carbon graphite or a titanate material, respectively.

Thus, the assembly of a lithium ion battery known in the state of the art usually comprises a first step of placing the electrolytic core(s), without the electrolytic solution in the packaging.

Assembly of the lithium battery also includes a second step of introducing the electrolytic solution that will wet the electrolytic core(s), and more particularly soak the separator of the electrolytic core(s).

Finally, the packaging is sealed, for example heat sealed, to make the assembly leak tight.

Obviously, the electrical connection tabs must be positioned before the packaging is sealed.

However, this method of manufacturing a lithium ion battery is not satisfactory.

The known method of assembly according to prior art requires the use of a liquid electrolytic solution introduced into the packaging, in a manner such that the separator will be satisfactorily impregnated.

It is also desirable to be able to eliminate this step, in order to simplify the method.

Furthermore, lithium ions batteries assembled using the assembly method known in prior art are not very flexible, correspondingly limiting the shape of said batteries (for example by rolling).

Furthermore, the assembly method known in prior art is limited to the production of plane electrodes. However, other electrode shapes may be required for some applications, and particularly for textile applications.

Thus, one purpose of this invention is to disclose a method of manufacturing an electrode for an accumulator that simplifies the method of assembling said accumulator.

Another purpose of this invention is to also disclose a method of manufacturing a flexible and even deformable membrane.

Another purpose of this invention is to disclose a method of manufacturing an electrode such that said electrode may be in shapes other than a place surface.

PRESENTATION OF THE INVENTION

The purposes of this invention are at least partly achieved by a method of manufacturing an electrode in gel form, for an alkali metal ion battery, the method comprises a step of extruding a mix comprising:
- an active electrode material
- a dinitrile compound with formula $N\equiv C-R-C\equiv N$, in which R is a hydrocarbon group $C_nH_{2n}$, and n is equal to 1 or 2 and preferably equal to 2,
- a hot melt support polymer with a glass transition temperature Tg, soluble in the dinitrile compound.

The electrode thus manufactured has good mechanical strength and ionic conductivity necessary for use in an alkali metal ion battery.

The extrusion method also opens up the way to fabrication of different shapes of electrodes, for example wires and hollow tubes, particularly for applications in the textile and medical fields.

Use of the method of gelling the support polymer by the dinitrile compound gives the electrode sufficient mechanical strength be used in an alkali metal ion battery, and an increased flexibility compared to electrodes known from the state of the art.

Moreover, the method according to the invention is simpler to use than methods known according to the state of the art.

According to one embodiment, the extrusion step is made by means of an extruder comprising at least one heating zone, at least one mixing zone and a pumping zone terminated by a die.

According to one embodiment, the support polymer is added into the extruder at the heating zone, where it is heated to a temperature T higher than the glass transition temperature Tg, advantageously to a temperature T between Tg and Tg+50° C.

According to one embodiment, the active electrode material is an active positive electrode material, and advantageously the active positive electrode material comprises at least one element chosen among:

$LiFePO_4$, $Li_2FeSiO_4$, $LiFeSO_4$, $LiMn_2O_4$, $LiNi_xMn_yCo_{1-2y}O_2$ (where x is between 0 and 1, and y is between 0 and 0.5), $LiNiO_2$, $LiMnO_3$, $LiMnO_2$, $LiMn_2O_3$, $Li_4Mn_5O_{12}$, $LiMn_{2-x}M_xO_2$ (in which M includes at least one element chosen from among: Co, Ni, Fe, Cr, Zn, Ti, and x is between 0.01 and 0.2), $Li_2Mn_3MO_8$ (in which M includes at least one element chosen from among: Fe, Co, Ni, Cu, Zn), $Li_{1-x}A_xMn_2O_4$ (in which A includes at least one element chosen from among: Mg, B, Al, Fe, Co, Ni, Cr, Zn, Ca and x is between 0.01 and 0.1), $LiNi_{1-x}M_xO_2$ (in which M includes at least one element chosen from among: Co, Fe, Ga: and x is between 0.01 and 0.2), $LiFeO_2$, $Fe_2(SO_4)_3$, $LiCo_{1-x}M_xO_2$ (in which M includes at least one element chosen from among: Ni, Fe, Mn; and x is between 0.01 and 0.2), $LiNi_{1-x}M_xO_2$ (in which M includes at least one element chosen from among: Mn, Fe, Co, Al, Ga, Ca, Mg; and x is between 0.01 and 0.2), $Fe(MoO_4)_3$, $FeF_3$, $LiMPO_4$, $LiMVO_4$, $Li_2MSiO_4$ (in which M includes at least one element chosen from among: Co, Ni, Mn, Fe), $KMn_2O_2$, $K_xMO_2$ (in which M includes at least one element chosen from among: Co, Ni, Fe, Cr, and x is between 0 and 1), $K_xFeMnO_2$ where x is between 0 and 1), $K_xMnO_2$ (where x is between 0 and 1), $K_xCr_{0.6}Ti_{0.4}O_2$, $X_xTi_{0.5}Co_{0.5}O_2$ (where x is between 0 and 1), $K_xCo_{1/3}Ni_{1/3}Mn_{1/3}O_2$ (where x is between 0 and 1), $K_x(Ni_{0.8}Co_{0.15}Al_{0.05})O_2$ (where x is between 0 and 1), $K_xFePO_4$ (where x is between 0 and 1), $K_2FePO_4F$, $K_xV_2O_5$ (where x is between 0 and 2), $K_xVPO_4F$ (where x is between 0 and 1), $K_xMnPO_4$ (where x is between 0 and 1), $FePO_4$, $K_3V_2(PO_4)_3$, $K_3V_2(PO_4)_2F_3$, $V_2O_5$, $K_{1.5}VOPO_4F_{0.5}$, $K_2Fe_2(SO_4)_3$, $KNi_{0.5}Mn_{0.5}O_2$, $K_{2/3}Ni_{1/3}Mn_{2/3}O_2$, $K_{0.45}Ni_{0.22}CO_{0.11}Mn_{0.66}O_2$, $K_{0.44}MnO_2$, $K_4Fe_3(PO_4)_2P_2O_7$, $K_xMFe(CN)_6$ (in which M includes at least one element chosen from among: Fe, Cu, Ni; and x is between 0 and 1).

According to one embodiment, the active electrode material is an active negative electrode material, and advantageously the active negative electrode material comprises at least one material chosen among:

$Li_4Ti_5O_{12}$, $TiO_2$, $Li_xC_6$ (where x is between 0 and 1), carbon graphite, carbon black, $Na_3V_2(PO_4)_2F_3$, $Na_{0.85}Li_{0.52}Ni_{0.21}Mn_{0.64}O_2$, $Na_3V_2(PO_4)_4$, $Na_3(Mn_{0.5}Fe_{0.5})PO_4$, $Na_2FePO_4F$, $NaFePO_4$, $NaTi_2(PO_4)_3$, $Na_2Ti_3O_7$, $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$, ($0<v\le2$), SiC, SiOC, LiSiO, $SiO_x$ (where x is between 0 and 2), $Fe_2O_3$, SnO, an LiM alloy (in which M includes at least one element chosen from among: Ag, Al, Ba, Bi, Cu, Ga, Ge, In, Ni, P, Pb, Sb, Si, Sn, Sr, Zn, Ti), a material containing an atom of tin contained in an alloy comprising at least one element chosen from among: Si, Ni, Cu, Fe, Co, Mn, Zn, Ag, Ti, Ge, Bi, Sb, Cr, O, C.

According to one embodiment, the support polymer comprises at least one element chosen from among polyvinylidene hexafluoropropylene copolyfluoride, poly(methyl methacrylate), poly(butyl methacrylate), polyethylene oxide, polyvinylpyrrolidone.

According to one embodiment, the mass ratio between the dinitrile compound and the support polymer is between 40/60 and 90/10.

According to one embodiment, the mix that will be extruded also comprises an alkali metal salt heat-solubilised in the dinitrile compound to form an electrolyte.

The term heat-solubilised means solubilised at a temperature higher than the melting temperature of the dinitrile compound.

The method according to the invention uses a single solvent, the dinitrile compound, to solubilise the alkali metal salt and to confer a gel form. In other words, there is no need to use a specific solvent for the support polymer. Consequently, no solvent evaporation step is required to use the method.

According to one embodiment, the alkali metal salt and the dinitrile compound are introduced into the extruder either in the heating zone, or in the mixing zone.

According to one embodiment, the alkali metal salt is a lithium salt, the lithium metal salt advantageously comprises at least one element chosen from among lithium bis-trifluoromethanesulfonimide, lithium bis(oxatlato)borate, $LiPF_6$, $LiClO_4$, $LiBF_4$, $LiAsF_6$, $LiCF_3SO_3$, $LiN(CF_3SO_2)_3$, $LiN(C_2F_5SO_2)$.

According to one embodiment, the concentration of the alkali metal salt in the dinitrile compound is between 0.5 mol/L$^{-1}$ and 5 mol/L$^{-1}$.

According to one embodiment, the mix also comprises an electronic conducting material, advantageously the electronic conducting material comprises at least one element chosen from among: carbon black, carbon fibres.

According to one embodiment, the gelled electrode is placed on a current collector after the extrusion step.

BRIEF DESCRIPTION OF THE DRAWINGS

Other characteristics and advantages will become clear in the following description of the method of manufacturing an electrode in gel form for an alkali-metal ion battery according to the invention, given as non-limitative examples, with reference to the appended drawings in which:

FIG. 1 is a diagrammatic view of a lithium ion battery, more particularly FIG. 1 represents the stack of constituent elements of the electrolytic core of said battery, FIG. 3b is a graphic view of the temperature profile in "° C." (along the vertical axis) as a function of the position along the elongation axis of the extruder shown on FIG. 3a, more particularly, FIG. 3b represents the temperature in each of the zones (A, B, C, D, E, F and G) of said extruder during the extrusion step for extrusion of the gelled electrode (Eg) and the support polymer (Es)

DETAILED PRESENTATION OF PARTICULAR EMBODIMENTS

In each of the different embodiments, the same references will be used for identical elements or elements performing the same function, in order to simplify the description.

The invention described in detail below implements a method of forming an electrode in gel form, of an alkali metal ion battery, using a melting method. More particularly, the melting method according to the invention involves an extrusion step. The method according to the invention for manufacturing flexible electrodes in gel form only uses a single solvent, the dinitrile compound that also acts as gelling agent of a polymer support used in the composition of said electrode.

Figure 2A:
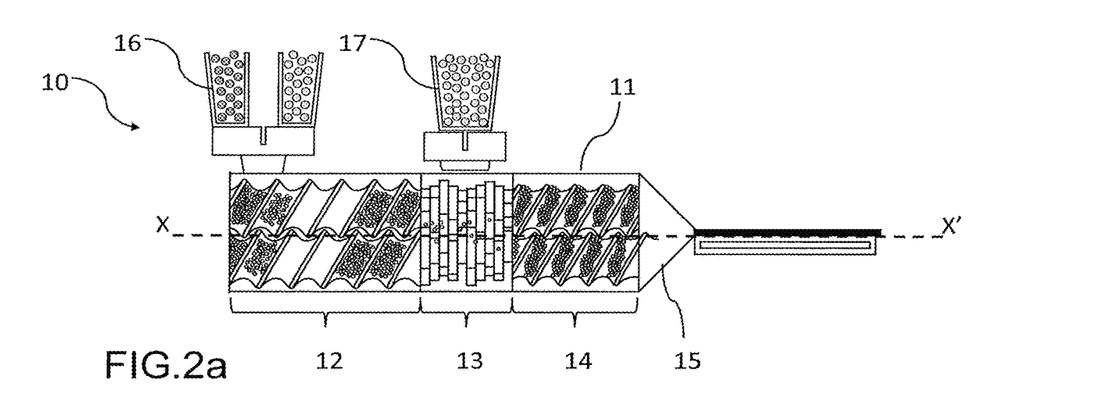
FIG. 2a is a diagrammatic according to a section plane of an extruder, the section plane containing the longitudinal XX' axis.
Figure 2B:
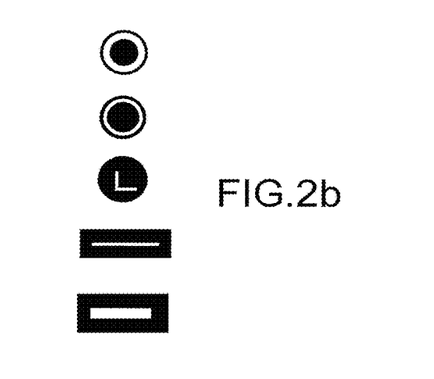
FIG. 2b is a diagrammatic view of different possible shapes of dies for implementation of the method according to the invention.

FIG. 2 shows an example embodiment of this invention.

The method according to the invention is carried out by extruding a mix. An extrusion method compresses the mix and forces it to pass through a die. The die imposes a given shape on the profile of the extruded mix.

Profile of the extruded mix means the intersection with a plane perpendicular to the direction of extrusion of said mix.

The extrusion is done by means of an extruder 10 and makes an intimate mix of the different elements composing the mix.

More particularly, extrusion makes thicker electrodes than those known according to the state of the art, for example with a thickness of between 10 μm and 2500 μm.

The extruder 10 comprises a sheath 11, extending along a longitudinal axis XX', inside which one or several, for example two, worm screws are placed. The extruder 10 may comprise heating zones 12, mixing zones 13, and pumping zones 14, the extruder being terminated by a die 15 (it is understood that the heating zones 12, the mixing zones 13, and the pumping zones 14 are inside the sheath).

A heating zone 12 is designed to melt at least one of the elements forming the mix, by increasing the temperature. The extruder is also provided with first feed means 16, for example a gravimetric feeder, in the heating zone 12, for adding elements that will form the mix. The temperature is increased by heating means, the design of which is known to the one of ordinary skills and consequently these means are not described in this application.

The mixing zone 13 intimately mixes the elements forming the mix and can be contiguous with a heating zone 12. Mixing is then done by mixing means 13 located on the worm screw(s). More particularly, the mixing means 13 interrupt the thread of the worm screws, and may include vanes. The mixing means are known the one of ordinary skills and therefore they are not described in this application. The mixing zone is also designed to induce a high shear rate and thus, as we will see in the remainder of the description, orient the chains of a support polymer.

A mixing zone 13 can also include second feed means 16.

The pumping zone 14 pushes the mix by pressure towards the die 13, and can be contiguous with a mixing zone 13. The worm screw(s) comprise a thread in the pumping zone 14 to apply the pressure necessary to push the mix towards the die 15.

The die 15 can confer any shape whatsoever on the profile of the extruded mix. More particularly, the mix can be extruded in the form of a sheet, a hollow tube or a wedge-shaped profile.

The extrusion can be made by adding all or some of the elements forming the mix into the extruder at the first feed means 16. The elements are heated in a heating zone 12, and are also pushed from the heating zone 12 towards a mixing zone 13 by the thread of the worm screw(s). Elements not added at the first feed means 16 are added at the second feed means 17.

The elements forming the mix comprise:
an active electrode material,
a dinitrile compound with formula N≡C—R—C≡N, in which R is a hydrocarbon group $C_nH_{2n}$, and n is equal to 1 or 2 and preferably equal to 2,
a hot melt support polymer with a glass transition temperature Tg, soluble in the dinitrile compound.

The term active electrode material means the active material of the electrode. More particularly, the active material of the positive electrode (cathode) or the negative electrode (anode) comprises an alkali metal ion insertion material. According to this invention, the alkali metal ion also comprises a cation chosen among: lithium ion, sodium ion, potassium ion.

Therefore the active material plays an insertion and extraction role for alkali metal ions during the charging and discharging process of an alkali metal ion battery. In other words, the active material directly participates in the electrochemical process when charging and discharging the battery.

Insertion and extraction of alkali metal ions in the active material must be reversible and must only induce minimal or no structural changes to the active material, so that charging and discharging cycles of the alkali metal ion battery are possible.

Furthermore, depending on envisaged applications for the battery, the active material placed on each of the electrodes must satisfy criteria related to:
thermal and chemical stability,
electronic conductivity,
chemical compatibility with the battery electrolyte,
capacity to insert alkali metal ions to confer a given capacity on the battery,
rate of insertion and extraction of alkali metal ions to guarantee a give power level of the battery.

Advantageously, the active electrode material is an active positive electrode material. Even more advantageously, the active positive electrode material comprises at least one element chosen from among:

$LiFePO_4$ (LFP), $Li_2FeSiO_4$, $LiFeSO_4$, $LiMn_2O_4$, $LiNi_xMn_yCo_{1-2y}O_2$ (where x is between 0 and 1, and y is between 0 and 0.5), $LiNiO_2$, $LiMnO_3$, $LiMnO_2$, $LiMn_2O_3$, $Li_4Mn_5O_{12}$, $LiMn_{2-x}M_xO_2$ (in which M includes at least one element chosen from among: Co, Ni, Fe, Cr, Zn, Ti, and x is between 0.01 and 0.2), $Li_2Mn_3MO_8$ (in which M includes at least one element chosen from among: Fe, Co, Ni, Cu, Zn), $Li_{1-x}A_xMn_2O_4$ (in which A includes at least one element chosen from among: Mg, B, Al, Fe, Co, Ni, Cr, Zn, Ca and x is between 0.01 and 0.1), $LiNi_{1-x}M_xO_2$ (in which M includes at least one element chosen from among: Co, Fe, Ga: and x is between 0.01 and 0.2), $LiFeO_2$, $Fe_2(SO_4)_3$, $LiCo_{1-x}M_xO_2$ (in which M includes at least one element chosen from among: Ni, Fe, Mn; and x is between 0.01 and 0.2), $LiNi_{1-x}M_xO_2$ (in which M includes at least one element chosen from among: Mn, Fe, Co, Al, Ga, Ca, Mg; and x is between 0.01 and 0.2), $Fe(MoO_4)_3$, $FeF_3$, $LiMPO_4$, $LiMVO_4$, $Li_2MSiO_4$ (in which M includes at least one element chosen from among: Co, Ni, Mn, Fe), $KMn_2O_2$, $K_xMO_2$ (in which M includes at least one element chosen from among: Co, Ni, Fe, Cr, and x is between 0 and 1), $K_xFeMnO_2$ where x is between 0 and 1), $K_xMnO_2$ (where x is between 0 and 1), $K_xCr_{0.6}Ti_{0.4}O_2$, $K_xTi_{0.5}Co_{0.5}O_2$ (where x is between 0 and 1), $K_xCo_{1/3}Ni_{1/3}Mn_{1/3}O_2$ (where x is between 0 and 1), $K_x(Ni_{0.8}Co_{0.15}Al_{0.05})O_2$ (where x is between 0 and 1), $K_xFePO_4$ (where x is between 0 and 1), $K_2FePO_4F$, $K_xV_2O_5$ (where x is between 0 and 2), $K_xVPO_4F$ (where x is between 0 and 1), $K_xMnPO_4$ (where x is between 0 and 1), $FePO_4$, $K_3V_2(PO_4)_3$, $K_3V_2(PO_4)_2F_3$, $V_2O_5$, $K_{1.5}VOPO_4F_{0.5}$, $K_2Fe_2(SO_4)_3$, $KNi_{0.5}Mn_{0.5}O_2$, $K_{2/3}Ni_{1/3}Mn_{2/3}O_2$, $K_{0.45}Ni_{0.22}CO_{0.11}Mn_{0.66}O_2$, $K_{0.44}MnO_2$, $K_4Fe_3(PO_4)_2P_2O_7$, $K_xMFe(CN)_6$ (in which M includes at least one element chosen from among: Fe, Cu, Ni; and x is between 0 and 1).

The excellent structure stability of $LiNi_xMn_yCo_{1-2y}O_2$ makes it a particularly interesting element for use in a positive electrode.

The use of LFP is also particularly advantageous for manufacturing a positive electrode. Although it is an electrical insulator, its formation consisting of nanometer sized particles coated with carbon improves the lithium ion insertion and extraction rate. Furthermore, LFP also has good chemical stability due to its polyanionic structure.

Advantageously, the active electrode material is an active negative electrode material. Even more advantageously, the active negative electrode material comprises at least one material chosen from among:

$Li_4Ti_5O_{12}$, $TiO_2$, $Li_xC_6$ (where x is between 0 and 1), carbon graphite, carbon black, $Na_3V_2(PO_4)_2F_3$, $Na_{0.85}Li_{0.52}Ni_{0.21}Mn_{0.64}O_2$, $Na_3V_2(PO_4)_4$, $Na_3(Mn_{0.5}Fe_{0.5})PO_4$, $Na_2FePO_4F$, $NaFePO_4$, $NaTi_2(PO_4)_3$, $Na_2Ti_3O_7$, $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v \leq 2$), $SiC$, $SiOC$, $LiSiO$, $SiO_x$ (where x is between 0 and 2), $Fe_2O_3$, $SnO$, an LiM alloy (in which M includes at least one element chosen from among: Ag, Al, Ba, Bi, Cu, Ga, Ge, In, Ni, P, Pb, Sb, Si, Sn, Sr, Zn, Ti), a material containing an atom of tin contained in an alloy comprising at least one element chosen from among: Si, Ni, Cu, Fe, Co, Mn, Zn, Ag, Ti, Ge, Bi, Sb, Cr, O, C.

For example, the active negative electrode material may comprise at least one alloy chosen from among: $SnO_w$ (where w is between 0 and 2), $SnSiO_3$, $LiSnO$, $Mg_2Sn$.

The active electrode material can be added into the extruder 10 at the first 16 or the second 17 feed means.

The mix may also comprise an alkali metal salt.

Alkali metal salt means a lithium salt, or a sodium salt, or a potassium salt.

A lithium salt may comprise at least one element chosen from among lithium bis-trifluoromethanesulfonimide (LiTFSI), lithium bis(oxatlato)borate (LiBoB), $LiPF_6$, $LiClO_4$, $LiBF_4$, $LiAsF_6$, $LiCF_3SO_3$, $LiN(CF_3SO_2)_3$, $LiN(C_2F_5SO_2)$.

A lithium salt comprising $LiPF_6$ is generally very frequently used for fabrication of the electrolytic solution for lithium ion batteries, however it can advantageously be replaced by a lithium salt comprising LiTFSI that does not degrade in contact with water.

Furthermore, LiTFSI has thermal and chemical stability that improves safety during use in lithium ion batteries, and also improves their performances. Thus, the alkali metal salt can advantageously contain LiTFSI.

A sodium salt may comprise at least one element chosen from among sodium bis-trifluoromethanesulfonimide (NaTFSI), sodium bis(oxatlato)borate (NaBoB), $NaPF_6$, $NaClO_4$, $NaBF_4$, $NaAsF_6$, $NaCF_3SO_3$, $NaN(CF_3SO_2)_3$, $NaN(C_2F_5SO_2)$.

A potassium salt may comprise at least one element chosen from among: Potassium bis-trifluoromethanesulfonimide (KTFSI), Potassium bis(oxatlato)borate (KBoB), $KPF_6$, $KClO_4$, $KBF_4$, $KAsF_6$, $KCF_3SO_3$, $KN(CF_3SO_2)_3$, $KN(C_2F_5SO_2)$, KSCN.

The alkali metal salt can indifferently be heat-solubilised in the dinitrile compound before extraction or during extraction.

The alkali metal salt solubilised in the dinitrile compound forms the electrolyte, also called the SNx electrolyte.

The alkali metal salt and the dinitrile compound, solubilised or not, can be added into the extruder at the first 15 or the second 16 feed means.

The concentration of alkali metal salt in the dinitrile compound can be between 0.5 mol/L$^{-1}$ and 5 mol/L$^{-1}$.

For example, the alkali metal salt can be $LiPF_6$, diluted in succinonitrile to 1M %.

Advantageously and still as an example, the alkali metal salt can be LiTFSI, diluted in succinonitrile to 1 M %, and more particularly in succinonitrile also containing LiBoB at 2 M %.

The function of the support polymer is to form a matrix with good mechanical strength at the positive and negative electrodes of the alkali metal ion battery. The support polymer also performs the function of host for the active electrode material.

According to the invention, the support polymer is hot melt (and possible thermo ductile) and is soluble in the dinitrile compound.

It is understood throughout this description that the support polymer, in the sense of the invention, has a glass transition temperature Tg.

The support polymer is added into the heating zone 12 of the extruder 10 at the first feed means 16.

The support polymer can then advantageously be heated to a temperature T higher than its glass transition temperature Tg.

The dinitrile compound is also added into the extruder either at the first feed means 16, or at the second feed means 17.

The melting temperature of the dinitrile compound used in the invention is more than 20° C.

The dinitrile compound is malononitrile or succinonitrile, when n=1 or n=2 respectively.

It is particularly advantageous if n=2, in other words if the dinitrile compound is succinonitrile. Succinonitrile is a hyperplastic, uninflammable and non-volatile organic compound with a melting temperature of 57° C. Furthermore, succinonotrile can be used in an alkali metal ion battery over a temperature range from −20° C. to 250° C.

The support polymer and the dinitrile compound are then brought into contact in the extruder, either in the heating zone 12, or in the mixing zone 13.

As soon as they are brought into contact either in the heating zone 12 or in the mixing zone 13, the support polymer and the dinitrile compound form a gel also comprising the active electrode material in dispersed form.

A gel means a three-dimensional lattice of solids diluted in a carrier fluid. Cohesion of the three-dimensional lattice may be achieved by chemical and/or physical bonds, and/or small crystals, and/or other bonds that remain intact in the carrier fluid.

As soon as it arrives in the mixing zone, the entire mix is homogenised and then pushed in the pumping zone 14, and then into the die 15 to be formed into the required shape of the separating membrane.

Advantageously, the mass ratio between the dinitrile compound and the support polymer is between 40/60 and 90/10, preferably between 65/35 and 75/25, and even more preferably of the order of 70/30.

The sum of the masses of the support polymer and the dinitrile compound in the positive electrode can be equal to 20% to 60%, and advantageously 30% to 40% of the mass of the positive electrode.

The sum of the masses of the support polymer and the dinitrile compound in the negative electrode can be equal to 20% to 60%, and advantageously 30% to 40% of the mass of the negative electrode.

The support polymer may include at least one of the elements chosen from among polyvinylidene hexafluoropropylene copolyfluoride 21216 (PVDF-HFP 21216), polyvinylidene hexafluoropropylene copolyfluoride 21510 (PVDF-HFP 21510), poly(methyl methacrylate) (PMMA), poly(butyl methacrylate) (PBMA), polyethylene oxide (PEO), polyvinylpyrrolidone (PVP).

The above-mentioned elements have the required chemical, thermal and electrochemical stability for use in a positive or negative electrode of an alkali metal ion battery.

The inventors also demonstrated that a support polymer comprising either the PEO or PVP polymer gelled practically instantaneously. Furthermore, after the gelling process, these two compounds are flexible, with slight swelling.

PEO, known for its ability to form complexes with a wide variety of lithium salts (when an alkali metal salt is considered for manufacturing of the electrode), has a relatively low ionic conductivity ($10^{-8}$ to $10^{-5}$ S/cm) at ambient temperature when it is used in solid form. However, as soon as it is combined with a dinitrile compound, and particularly succinonitrile, the ionic conductivity of gelled PEO increases. For example, the gelled mix comprising PEO, succinonitrile and LiTFSI, in proportions 70:25:5, has an ionic conductivity of the order of $10^{-3}$ S/cm.

Thus, use of the dinitrile compound and particularly succinonitrile, as plastifier, improves the ionic conductivity of support polymers that could not have been envisaged for use with a solid method.

Also, if the dinitrile compound is succinonitrile, heating the support polymer to a temperature of between Tg and Tg+50° C., advantageously between Tg and Tg+25° C., can result in an electrode in gel form.

Succinonitrile makes it possible to use extrusion temperatures close to the glass transition temperature of the support polymer.

A support polymer comprising one of the PVDF-HFP 21216 and PVDF-HFP 21510 polymers, after gelling with the dinitrile compound, has crystalline regions that participate in good mechanical strength of the electrode, and amorphous regions capable of trapping a large quantity of the mix of alkali metal salt solubilised in the dinitrile compound. The use of such polymers can give electrodes with good mechanical strength and electrochemical performances compatible with their use in an alkali metal ion battery.

Concerning PMMA, the inventors have been able to demonstrate that PMMA can gel with a mass content of up to 70% of dinitrile compound (more particularly succinonitrile). Furthermore, the electrode thus obtained has good mechanical strength for a thickness of 60 µm.

The electronic conductivity of the active electrode material when it is in dispersed form (forming aggregates of active material) in the electrode, does not enable optimum electron transport. Thus, and advantageously, the mix may comprise an electronic conducting material designed to form a percolation network within the electrode. More particularly, the electron conducting material is dispersed in the mix (after being added into the extruder at either the first feed means 16 or at the second feed means 17), and forms a percolation network to improve electron transport within the electrode.

In particular, the percolation network thus formed within the electrode may include a short-distance component and a long-distance component.

The short-distance component is a short-distance percolation network and enables intra-aggregate electron transport of the active material.

The long-distance component is a long-distance percolation network and enables inter-aggregate electron transport of the conducting material.

The short-distance percolation network may include carbon black (carbon black contains spherical carbon nanoparticles).

The long-distance percolation network includes at least one element chosen from among: multi-wall carbon nanotube, carbon fibre.

The extruded electrode in gel form may be hot rolled on a current collector.

The current collector may include at least one element chosen from among: carbon felt, a copper or aluminium metal foil.

For example, a positive electrode was formed from the mix presented in Table 1.

TABLE 1

|  | Constituent | Proportion (in %) |
| --- | --- | --- |
| Support polymer | PMMA | 15% |
| Dinitrile compound and Lithium salt | Succinonitrile and lithium salt | 35% |
| Active positive electrode material | NMC | 38% |
| Short-distance component | Carbon black | 6.3% |
| Long distance component | Multi-wall carbon nanotubes | 6.3 |

Figure 3A:
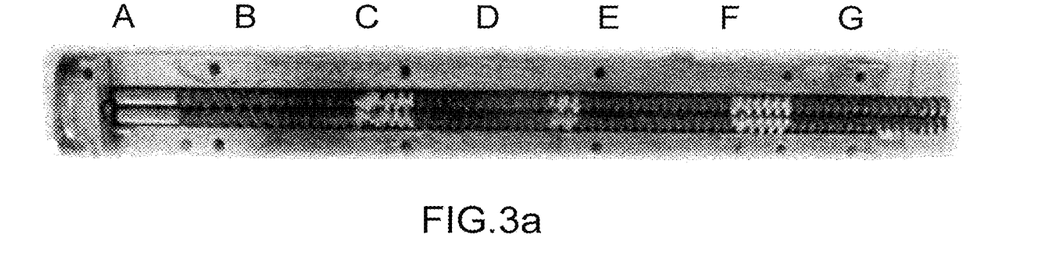
FIG. 3a is a sectional view of an extruder for implementation of the method according to the invention, the extruder comprises 7 zones denoted A, B, C, D, E, F and G successively along its elongation axis, zones A et G represent the feed zone and the exit zone from the extruder, respectively.

The mix given in the table is then added into an extruder shown in FIG. 3a, comprising 7 zones denoted A, B, C, D, E, F and G.

Figure 3B:
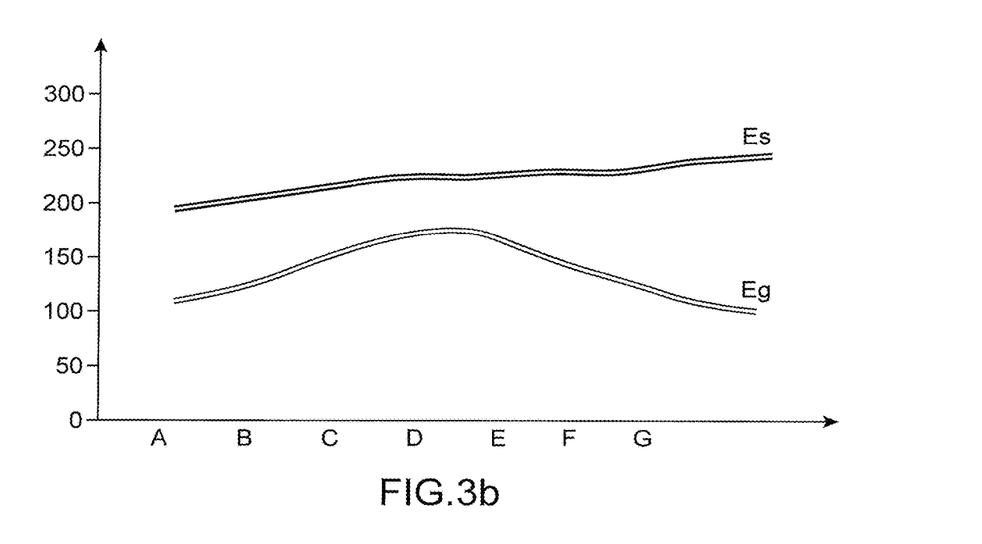

The temperature profile in the extruder during the extrusion step is given in FIG. 3b for extrusion of the electrode in gel form (Eg) and the support polymer (Es), respectively.

A self-supporting 100 µm thick gel film is obtained at the exit from the extruder, and is transferred hot (at 80° C.) onto a current collector comprising a carbon felt.

In order to test the performances of the positive electrode thus obtained, this positive electrode is assembled in a battery comprising an electrolytic membrane and a negative electrode made of lithium metal.

The electrolytic membrane is in gel form and comprises:
70% of PVDF-HFP as support polymer
25% of succinonitrile,
5% of LiTFSI The electrolytic membrane can also be formed by extrusion, or by a method called the ambient temperature solvent process.

Otherwise, a solvent can be used to solubilise the support polymer, and is then evaporated.

Figure 4:
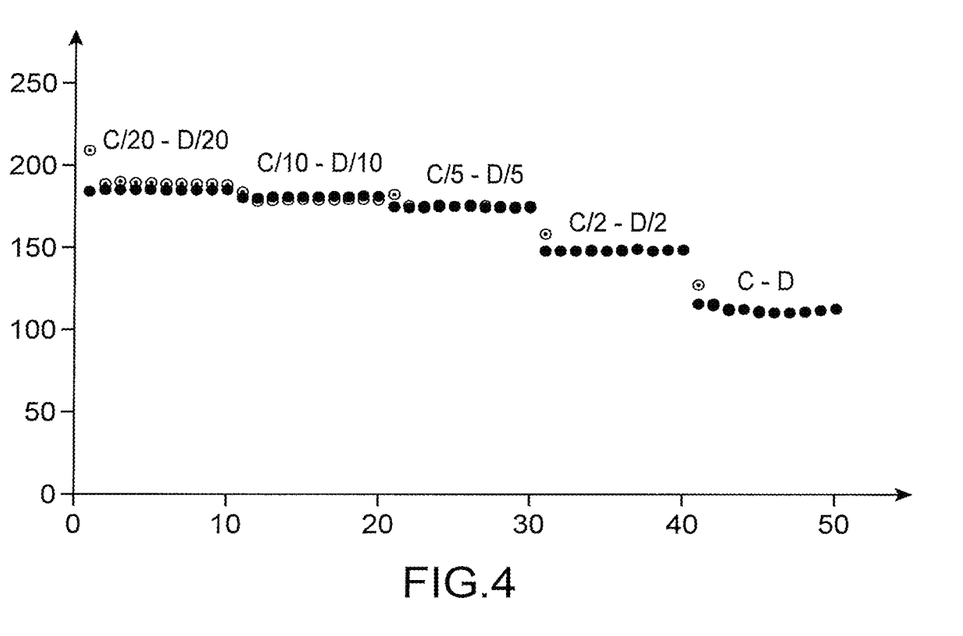
FIG. 4 is a graphic view of the capacity in mAh/g (vertical axis) of a gelled positive electrode obtained according to the invention, as a function of the charge and discharge cycles.

The battery thus formed can be tested using a galvanostatic procedure (shown on FIG. 4) beginning with charge cycles to C/20, C/10, C/5, C/2 and C, in order.

The same procedure is then executed also including discharge cycles to D/20, D/10, D/5, D/2 and D.

The capacity conferred by the electrode thus manufactured according to this invention is of the order of 180 mAh/g of NMC.

Also as an example, a positive electrode was formed from the mix presented in Table 1.

| Constituent | Proportion (in %) |
|---|---|---|
| Support polymer | PMMA | 15% |
| Dinitrile compound and Lithium salt | Succinonitrile and lithium salt | 35% |
| Active negative electrode material | LiFePO4 | 38% |
| Short-distance component | Carbon black | 6.3% |
| Long distance component | Multi-wall carbon nanotubes | 6.3 |

The method of manufacturing this positive electrode reuses most of the manufacturing steps for the positive electrode given in the previous example.

The gelled positive electrode manufactured according to this invention can achieve a capacity of the order of 140 mAh/g.

The invention is not limited to a single support polymer, and a plurality of support polymers can be envisaged.

Note also that the separating membrane can also be made by an extrusion process, and can be colaminated with the positive and negative electrodes.

More particularly, the separating membrane can be in gel form.

Thus, the formation of the separating membrane may include extrusion of a mix containing:
a support polymer,
an electrolyte containing an alkali metal salt solubilised in a dinitrile compound with formula N≡C—R—C≡N, in which R is a hydrocarbon group $C_nH_{2n}$, and n is equal to 1 or 2,
an alkali metal salt, The choice of the support polymer and the alkali salt can be the same as that chosen for the method of manufacturing the separating membrane described above.

The dinitrile compound can advantageously be succinonitrile.

The extrusion can also be made under conditions similar to the conditions for extrusion of the separating membrane according to the invention.

More particularly, the method of manufacturing the separating membrane is different from the method of manufacturing the electrode in gel form in that the mix does not contain an active electrode material or an electron conducting material.

Thus, colamination of the positive electrode, the separating membrane and the negative electrode can be done directly at the exit from three extruders.

The method according to the invention does not require a step of adding an electrolyte solution. The electrolyte is at least included in the separating membrane (SNx mix).

Furthermore, the presence of the SNx mix also in the negative and positive electrodes enables better transport of alkali metal ions from an electrode to the separating membrane and vice versa.

The invention claimed is:

1. A method of manufacturing an electrode in gel form for an alkali metal ion battery, the method comprising
extruding a mix comprising:
an active electrode material;
a dinitrile compound of formula N≡C—R—C≡N, where R is a hydrocarbon group of $C_nH_{2n}$, and n is 1 or 2; and
a hot melt support polymer which has a glass transition temperature Tg and is soluble in the dinitrile compound.

2. The method according to claim 1, wherein said extruding is carried out via an extruder comprising at least one heating zone, at least one mixing zone, and a pumping zone terminated by a die.

3. The method according to claim 2, wherein the support polymer is added into the extruder at the heating zone, where it is heated to a temperature T higher than the glass transition temperature Tg.

4. The method according to claim 1, wherein the active electrode material is an active positive electrode material.

5. The method according to claim 1, wherein the active electrode material is an active negative electrode material.

6. The method according to claim 1, wherein the support polymer comprises at least one selected from the group consisting of polyvinylidene hexafluoropropylene copolyfluoride, poly(methyl methacrylate), poly(butyl methacrylate), polyethylene oxide, and polyvinylpyrrolidone.

7. The method according to claim 1, wherein a mass ratio of the dinitrile compound to the support polymer ranges from 40/60 to 90/10.

8. The method according to claim 1, wherein the mix further comprises an alkali metal salt heat-solubilised in the dinitrile compound to form an electrolyte.

9. The method according to claim 8, wherein
said extruding is carried out via an extruder comprising at least one heating zone, at least one mixing zone, and a pumping zone terminated by a die, and
the alkali metal salt and the dinitrile compound are added into the extruder either in the heating zone or the mixing zone.

10. The method according to claim 9, wherein the alkali metal salt is a lithium salt.

11. The method according to claim 8, wherein a concentration of the alkali metal salt in the dinitrile compound is between 0.5 mol/L and 5 mol/L.

12. The method according to claim 1, wherein the mix also comprises an electronic conducting material.

13. The method according to claim 1, wherein the electrode in gel form is placed on a current collector after said extruding.

14. The method according to claim 3, wherein Tg<T≤Tg+50° C.

15. The method according to claim 4, wherein the active positive electrode material comprises at least one selected from the group consisting of:
$LiFePO_4$, $Li_2FeSiO_4$, $LiFeSO_4$, $LiMn_2O_4$,
$LiNi_xMn_yCo_{1-2y}O_2$, where x is between 0 and 1 and y is between 0 and 0.5,
$LiNiO_2$, $LiMnO_3$, $LiMnO_2$, $LiMn_2O_3$, $Li_4Mn_5O_{12}$,
$LiMn_{2-x}M_xO_2$, where M includes at least one selected from the group consisting of Co, Ni, Fe, Cr, Zn, and Ti, and x is between 0.01 and 0.2,
$Li_2Mn_3MO_8$, where M includes at least one selected from the group consisting of Fe, Co, Ni, Cu, and Zn,
$Li_{1-x}A_xMn_2O_4$, where A includes at least one selected from the group consisting of Mg, B, Al, Fe, Co, Ni, Cr, Zn, and Ca, and x is between 0.01 and 0.1,
$LiNi_{1-x}M_xO_2$, where M includes at least one selected from the group consisting of Co, Fe, and Ga, and x is between 0.01 and 0.2,
$LiFeO_2$, $Fe_2(SO_4)_3$,
$LiCo_{1-x}M_xO_2$, where M includes at least one selected from the group consisting of Ni, Fe, and Mn, and x is between 0.01 and 0.2,
$LiNi_{1-x}M_xO_2$, where M includes at least one selected from the group consisting of Mn, Fe, Co, Al, Ga, Ca, and Mg, and x is between 0.01 and 0.2, $Fe(MoO_4)_3$, $FeF_3$, $LiMPO_4$, $LiMVO_4$, $Li_2MSiO_4$, where M includes at least one selected from the group consisting of Co, Ni, Mn, and Fe, $KMn_2O_2$, $K_xMO_2$, where M includes at least one selected from the group consisting of Co, Ni, Fe, and Cr, and x is between 0 and 1, $K_xFeMnO_2$, where x is between 0 and 1, $K_xMnO_2$, where x is between 0 and 1, $K_xCr_{0.6}Ti_{0.4}O_2$, $K_xTi_{0.5}Co_{0.5}O_2$, where x is between 0 and 1, $K_xCo_{1/3}Ni_{1/3}Mn_{1/3}O_2$, where x is between 0 and 1, $K_x(Ni_{0.8}Co_{0.15}Al_{0.05})O_2$, where x is between 0 and 1, $K_xFePO_4$, where x is between 0 and 1, $K_2FePO_4F$, $K_xV_2O_5$, where x is between 0 and 2, $K_xVPO_4F$, where x is between 0 and 1, $K_xMnPO_4$, where x is between 0 and 1, $FePO_4$, $K_3V_2(PO_4)_3$, $K_3V_2(PO_4)_2F_3$, $V_2O_5$, $K_{1.5}VOPO_4F_{0.5}$, $K_2Fe_2(SO_4)_3$, $KNi_{0.5}Mn_{0.5}O_2$, $K_{2/3}Ni_{1/3}Mn_{2/3}O_2$, $K_{0.45}Ni_{0.22}CO_{0.11}Mn_{0.66}O_2$, $K_{0.44}MnO_2$, $K_4Fe_3(PO_4)_2P_2O_7$, and $K_xMFe(CN)_6$, where M includes at least one selected from the group consisting of Fe, Cu, and Ni, and x is between 0 and 1.

16. The method according to claim 5, wherein the active negative electrode material comprises at least one selected from the group consisting of:

$Li_4Ti_5O_{12}$, $TiO_2$, $Li_xC_6$, where x is between 0 and 1, carbon graphite, carbon black, $Na_3V_2(PO_4)_2F_3$, $Na_{0.85}Li_{0.52}Ni_{0.21}Mn_{0.64}O_2$, $Na_3V_2(PO_4)_4$, $Na_3(Mn_{0.5}Fe_{0.5})PO_4$, $Na_2FePO_4F$, $NaFePO_4$, $NaTi_2(PO_4)_3$, $Na_2Ti_3O_7$, $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$, where $0 < v \leq 2$, SiC, SiOC, LiSiO, $SiO_x$ where x is between 0 and 2, $Fe_2O_3$, SnO, an LiM alloy, where M includes at least one selected from the group consisting of Ag, Al, Ba, Bi, Cu, Ga, Ge, In, Ni, P, Pb, Sb, Si, Sn, Sr, Zn, and Ti, and a material comprising an alloy containing tin and at least one selected from the group consisting of Si, Ni, Cu, Fe, Co, Mn, Zn, Ag, Ti, Ge, Bi, Sb, Cr, O, and C.

17. The method according to claim 10, wherein the lithium salt comprises at least one selected from the group consisting of lithium bis-trifluoromethanesulfonimide, lithium bis(oxatlato)borate, $LiPF_6$, $LiClO_4$, $LiBF_4$, $LiAsF_6$, $LiCF_3SO_3$, $LiN(CF_3SO_2)_3$, and $LiN(C_2F_5SO_2)$.

18. The method according to claim 12, wherein the electronic conducting material comprises carbon black and/or carbon fibres.

* * * * *